(12) United States Patent
McMillan et al.

(10) Patent No.: US 6,653,650 B2
(45) Date of Patent: Nov. 25, 2003

(54) STREAMLINED METHOD AND APPARATUS FOR ALIGNING A SENSOR TO AN AIRCRAFT

(75) Inventors: Donald R. McMillan, Indialantic, FL (US); Gregory Foroglou, Melbourne, FL (US); Scott E. Hoffman, Melbourne Beach, FL (US); Joaquin E. Carvajal, West Melbourne, FL (US); William R. Checcia, Melbourne, FL (US)

(73) Assignee: Northrop Grumman Corporation, Los Angeles, CA (US)

( * ) Notice: Subject to any disclaimer, the term of this patent is extended or adjusted under 35 U.S.C. 154(b) by 102 days.

(21) Appl. No.: 09/994,250

(22) Filed: Nov. 26, 2001

(65) Prior Publication Data

US 2003/0098972 A1 May 29, 2003

(51) Int. Cl.⁷ .............................................. G01N 21/86
(52) U.S. Cl. ..................... 250/559.3; 250/548
(58) Field of Search .................. 250/559.3, 559.37, 250/548, 216; 356/139.03, 152.2, 141.1, 153; 33/286

(56) References Cited

U.S. PATENT DOCUMENTS

| | | | |
|---|---|---|---|
| 3,612,949 A | | 10/1971 | Becraft et al. |
| 3,633,212 A | | 1/1972 | Cooper |
| 3,703,682 A | * | 11/1972 | Wickman et al. ........... 324/245 |
| 3,709,608 A | | 1/1973 | Degan et al. |
| 3,723,013 A | * | 3/1973 | Stirland et al. .......... 356/152.1 |
| 3,994,588 A | * | 11/1976 | Marx ...................... 356/152.2 |
| 4,168,123 A | | 9/1979 | Price |
| 4,649,274 A | | 3/1987 | Hartmann |
| 5,005,973 A | | 4/1991 | Mimmack et al. |
| 5,600,893 A | | 2/1997 | Phillips |
| 5,936,723 A | | 8/1999 | Schmidt et al. |
| 6,259,519 B1 | * | 7/2001 | Hooker et al. ......... 356/139.03 |

FOREIGN PATENT DOCUMENTS

FR          2707000      *  6/1993

* cited by examiner

Primary Examiner—Que T. Le
Assistant Examiner—Eric J Spears
(74) Attorney, Agent, or Firm—Stetina Brunda Garred & Brucker

(57) ABSTRACT

An apparatus for sensing mis-alignment between an aircraft inertial reference frame and a reference frame of an attached sensor is disclosed. The apparatus includes a first laser mounted on the sensor and in the center of and normal to a first measuring surface; and, a second laser also mounted on the sensor perpendicular to the first laser and in the center of and normal to a second measuring surface. A first reflector is mounted to and aligned with the inertial reference frame of the aircraft and is disposed for reflecting a beam of light from the first laser, whereby misalignment in roll and yaw between the sensor and the aircraft is reflected on the first measuring surface. In a similar manner, a second reflector is mounted to and aligned with the inertial reference frame of the aircraft and perpendicular to the first reflector, and is disposed for reflecting a beam of light from the second laser, whereby misalignment in roll and pitch between the sensor and the aircraft is reflected on the second measuring surface. The misalignment bias may later be read manually or electronically, and then used by the aircraft's or sensor's computer system to compensate for the misalignment bias.

24 Claims, 2 Drawing Sheets

STREAMLINED METHOD AND APPARATUS FOR ALIGNING A SENSOR TO AN AIRCRAFT

STATEMENT RE: FEDERALLY SPONSORED RESEARCH/DEVELOPMENT

This invention was made with United States Government support under Contract No. N61331-00-C-0022 awarded by the U.S. Navy. Accordingly the United States Government has certain rights in this invention.

CROSS-REFERENCE TO RELATED APPLICATIONS (Not Applicable)

BACKGROUND OF THE INVENTION

The present invention generally relates to alignment systems and techniques, and in particular to a streamlined method and apparatus for aligning a sensor to an aircraft using the inertial frame reference of the aircraft.

Sensors may typically comprise a camera, radar or laser radar, or navigational equipment, or any other related type of equipment. As a general rule, sensors are calibrated to their host aircraft's inertial frame reference by first stabilizing the aircraft (i.e., shoring up the aircraft) and then bore sighting the sensor to precisely align it with the aircraft prior to being fixed in place. This is a cumbersome and time consuming technique and must be done for each sensor attached to each aircraft during the installation process.

A prior art approach is to add a three-axis inertial measurement unit to the sensor to compare with three-axis inertial measurements from the host aircraft. This adds cost and weight to the sensor, and requires the aircraft to fly for a period of time with the sensor to gather sufficient inertial measurements to determine the relative alignment between them.

An exemplary prior art device for measuring changes in the alignment of a component with respect to a reference axis of an aircraft is disclosed in U.S. Pat. No. 4,168,123, entitled AIRCRAFT WEAPONS SYSTEMS. This prior art device measures alignment by measuring displacement through a lens apparatus remote from the source. The device employs an infrared or electromagnetic source located on a wing-mounted pod of an aircraft with a lens focusing apparatus that focuses on targets mounted on the fuselage of the aircraft. Any measured displacement is provided in the form of an output signal indicative of the displacement. The output signal is then used by the aircraft's weapons system to take into account such displacement.

On the other hand, the invention disclosed in this application employs a laser or other light source collocated with a target/sensor, which measures misalignment by measuring displacement of a laser, light or other beam reflected off of a pair of simple mirrors. The mirrors are permanently attached to and aligned with the inertial frame reference of the host aircraft. It should be noted that with the invention disclosed herein a single beam is used to measure two angles of alignment (e.g., pitch and yaw), whereas the above-referenced patented device requires two beams to measure a single angle of alignment (e.g., pitch).

Another similar prior art device for measuring changes in the alignment of a component with respect to a reference axis of an aircraft is disclosed in U.S. Pat. No. 3,633,212, entitled SYSTEM FOR DETERMINING THE ORIENTATION OF AN OBJECT BY EMPLOYING PLANE POLARIZED LIGHT. This prior art device employs a polarized light source and a motion picture camera, both of which are mounted on the aircraft. It is noted that the light source and the camera are not collocated, but are located some distance apart from one another. A plurality of specially oriented light-polarizing reflectors are attached to the component (e.g., a missile), which are observed by the camera. A source of plane-polarized light on the aircraft illuminates the reflectors on the missile. The attitude of the latter with respect to this source determines the amount of illumination picked up by the camera from each reflector. Such data is then coordinated to yield the positional information desired.

In contrast to the prior art device just described, the present invention measures alignment directly by measuring displacement of a laser, light or other beam reflected off of a pair of simple mirrors that are aligned with the inertial frame reference of the aircraft.

There is a need for an improved, low-cost technique for aligning a sensor with a host aircraft that will be easier and faster while maintaining the same degree of accuracy.

BRIEF SUMMARY OF THE INVENTION

Accordingly, a feature of the present invention is the provision of an improved technique for calibrating any misalignment of a sensor attached to an aircraft with the aircraft's inertial frame reference.

Another feature of the present invention is the provision of an alignment detection mechanism and technique that can be quickly read and interpreted and may be used by the host aircraft's on-board computer in compensating for any deviation in alignment.

Yet another feature of the present invention is the use of low-power lasers and mirrors to read and interpret any misalignment between a host aircraft's inertial frame reference and the frame reference of an attached sensor.

An advantage of the present invention over the prior art devices is that the number of components are greatly decreased, thereby reducing the cost and simplifying the device.

Another advantage of the present invention is the elimination of measurement errors due to position and lateral displacement uncertainties from the source, target/sensor, or store object being measured.

Still another advantage of the present invention is that, by collocating the source and target, the design and system operation is simplified.

These and other features and advantages, which will become apparent as the invention is described in detail below, are provided by an apparatus for sensing misalignment between an aircraft's inertial reference frame and a reference frame of an attached sensor. The apparatus includes a first laser mounted on the sensor and in the center of and normal to a first measuring surface aligned with the frame reference of the sensor; and, a second laser also mounted on the sensor perpendicular to the first laser and in the center of and normal to a second measuring surface also aligned with the frame reference of the sensor. A first reflector is mounted to and aligned with the inertial reference frame of the aircraft and is disposed for reflecting a beam of light from the first laser, whereby misalignment in roll and yaw between the sensor pod and the aircraft is reflected on the first measuring surface. In a similar manner, a second reflector is mounted and aligned with the inertial reference frame of the aircraft and perpendicular to the first reflector, and is disposed for reflecting a beam of light from the second laser, whereby misalignment in roll and pitch between the sensor pod and the aircraft is reflected on the second measuring surface. The misalignment bias may later be read manually or electronically, and then used by the aircraft computer system to compensate for the bias.

Moreover, a method is disclosed for sensing misalignment between an aircraft's inertial reference frame and a reference frame of an attached sensor. The method includes the steps of emitting a first light beam from and normal to a first measuring surface mounted on the sensor, wherein the first measuring surface is aligned with the reference frame of the sensor. Next, a second light beam is emitted from and normal to a second measuring surface mounted on the sensor, wherein the second measuring surface is also aligned with the reference frame of the sensor. After this, the first light beam is reflected from a reflector mounted on and aligned with an inertial reference frame of the aircraft, whereby misalignment in roll and yaw between the sensor and the aircraft is reflected on the first measuring surface. In a similar manner, the second light beam is reflected from a reflector mounted perpendicular to the first reflector and aligned with the inertial reference frame of the aircraft, whereby misalignment in pitch and roll between the sensor and the aircraft is reflected on the second measuring surface. The misalignment bias may later be read manually or electronically, and then used by the aircraft computer system to compensate for the bias.

Still other features and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive, and what is intended to be protected by Letters Patent is set forth in the appended claims.

BRIEF DESCRIPTION OF THE DRAWINGS

The general purpose of this invention, as well as a preferred mode of use, its objects and advantages will best be understood by reference to the following detailed description of an illustrative embodiment with reference to the accompanying drawings in which like reference numerals designate like parts throughout the figures thereof, wherein.

DETAILED DESCRIPTION OF THE INVENTION

Figure 1:
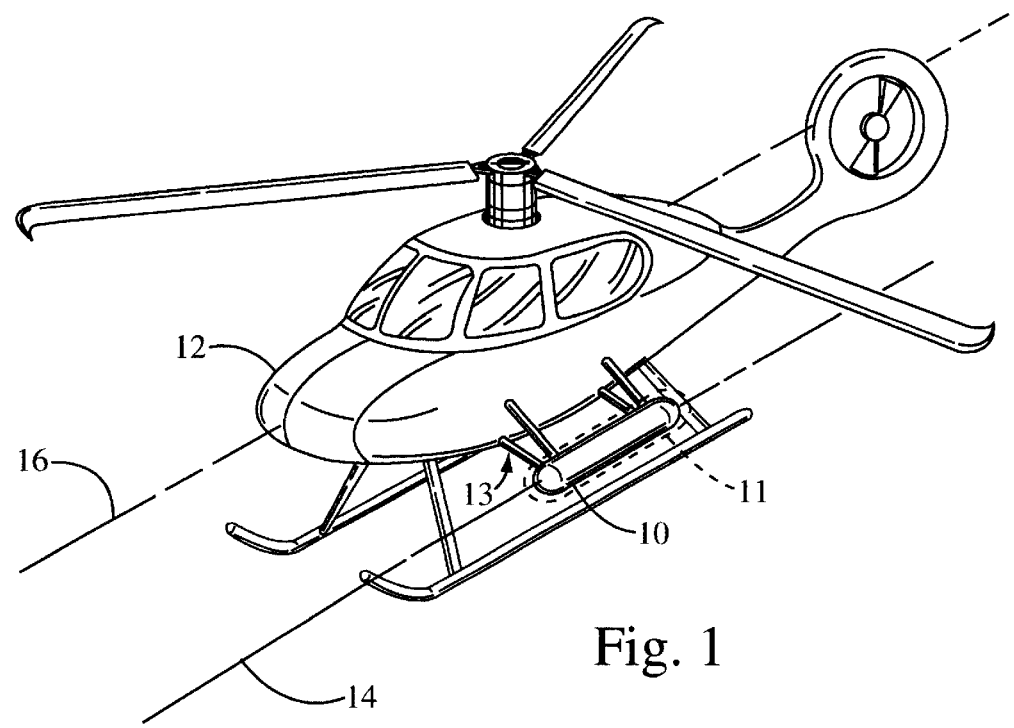
FIG. 1 is a perspective of an aircraft with a typical sensor pod attached.

Typically, just prior to a mission, a sensor 10 is installed in an outboard store station 11 of a helicopter 12 (or any other type of aircraft) by means of a pylon structure 13. To further complicate matters, neither the pylon structure 13 nor the sensor 10 are dedicated to a particular aircraft. As a result, there is no likelihood that a sensor mounted on a given pylon will align with the inertial frame reference of the host aircraft. Hence, it is necessary to rapidly determine the misalignment of a given sensor and pylon combination to a given aircraft prior to a mission. The mis-alignment between the aircraft frame reference and the frame reference of the pod, referred to herein sometimes as bias, can then be entered into the aircraft's on-board computer system and used for compensating alignment by means of well-known software techniques.

There are six degrees of freedom in attaching and aligning the sensor 10 to the aircraft 12. Three are positional: x, y and z; and three are angular: pitch, roll and yaw. For targets any appreciable distance from the aircraft, the angular displacements are the most important. Hence, the apparatus described herein provides a streamlined technique for determining the angular displacements without measuring the positional errors.

Each of the host aircraft, such as aircraft 12, are modified by installing two reflective targets (shown in FIG. 2) on stable locations of the aircraft. Typically, these targets are perpendicular to one another and they must be precisely aligned with the inertial frame reference of the aircraft. However, other angles may be used as explained herein. Since this is a one-time procedure, it can be done while the aircraft is stabilized and shored up using traditional techniques.

Using this system, a targeting sensor 10 can be rapidly registered in pitch, roll and yaw without the use of external transits or without having to shore the aircraft.

The sensor 10 has a reference frame with a central axis 14, and the aircraft 12 has an inertial frame reference with a central axis 16. In the ideal situation, the axes 14 and 16 are parallel. However, in practice this may not always be the case. For example, if the sensor 10 is moved from one aircraft to another then it is most likely that the two axes 14 and 16 will not be parallel.

Figure 2:
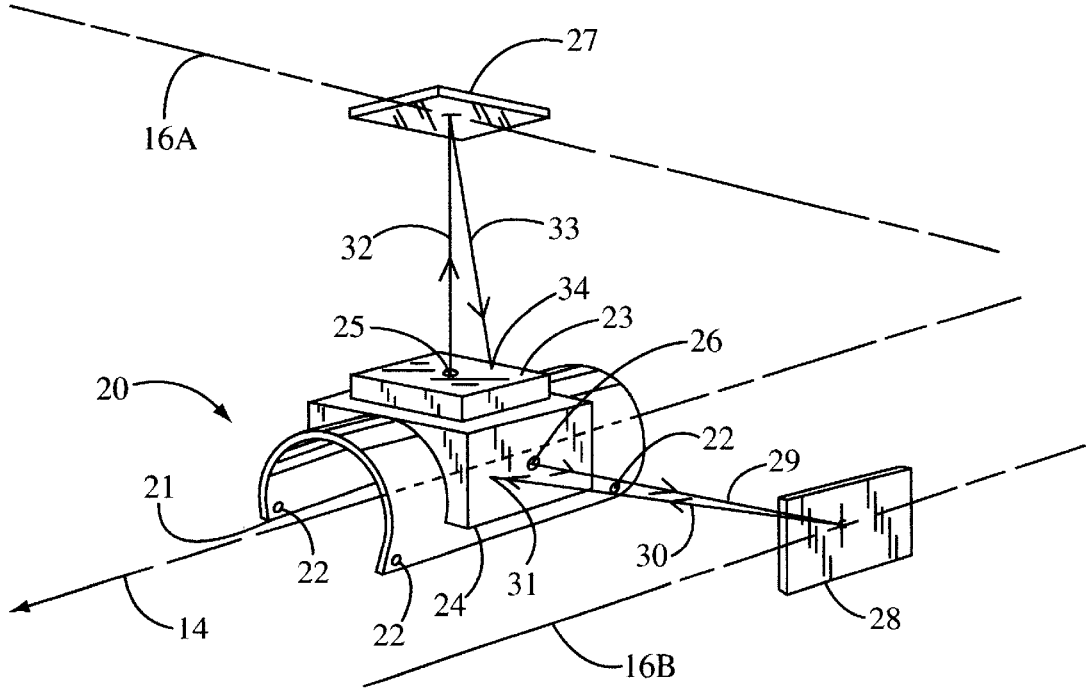
FIG. 2 is a schematic diagram illustrating the alignment technique according to the present invention.

One embodiment of the present invention is illustrated in the schematic diagram of FIG. 2. The removable alignment tool 20 of the present invention employs a housing 21 that can be installed externally to the sensor 10 through tooling holes 22 and precision ground pins (not shown). This arrangement assures that measuring surfaces 23 and 24 of the pod 10 are in alignment with the inertial frame reference of the sensor 10.

Each of the measuring surfaces 23 and 24 house lowpower laser pointing devices 25 and 26, respectively; which devices are aligned normal to (or at other specific angles to) the measuring surfaces. Aircraft target reflectors 27 and 28, and the alignment tool 20, are located such that the laser beam pointing devices 25 and 26 strike the target reflectors 27 and 28 and are reflected back onto the measuring surfaces 23 and 24. This allows the angular displacements to be read directly from the target surfaces 23 and 24.

The target reflectors 27 and 28 are affixed to stable locations in the aircraft 12 and are precisely aligned with the inertial reference frame of the aircraft. The alignment axes of the surfaces of the target reflectors 27 and 28 are denoted herein as axis 16A and axis 16B.

The laser pointing devices 25 and 26 are mounted in the center of the measuring surfaces 23 and 24, which surfaces are aligned precisely with the inertial reference frame of the sensor pod 10 as described hereinabove. The laser pointing device 26 produces a beam 29 that is directed to the target reflector 28 and a reflected beam 30 is returned back to the reflective surface 24. The difference between the center point of the surface 24 (i.e., the point of origin of the laser beam from the device 26) and a point 31 at which the reflected beam 30 strikes the surface 24 indicates the roll and yaw misalignment bias of the sensor 10 from the aircraft 12. It is pointed out at this juncture of the description that, if a sensor to which the tool 20 were attached and aligned perfectly parallel with the aircraft's inertial frame reference, then the reflector 28 would reflect back the laser beam at a point coaxial with the laser 26 itself.

In a similar manner, the laser pointing device 25 produces a beam 32 that is directed to the target reflector 27 and a reflected beam 33 is returned back to the reflective surface 23 at a point 34. The difference between the center point of the surface 23 (i.e., the location of the laser pointing device 25) and the point 34 indicates the pitch and roll misalignment bias of the sensor 10 from the aircraft 12.

Figure 3:
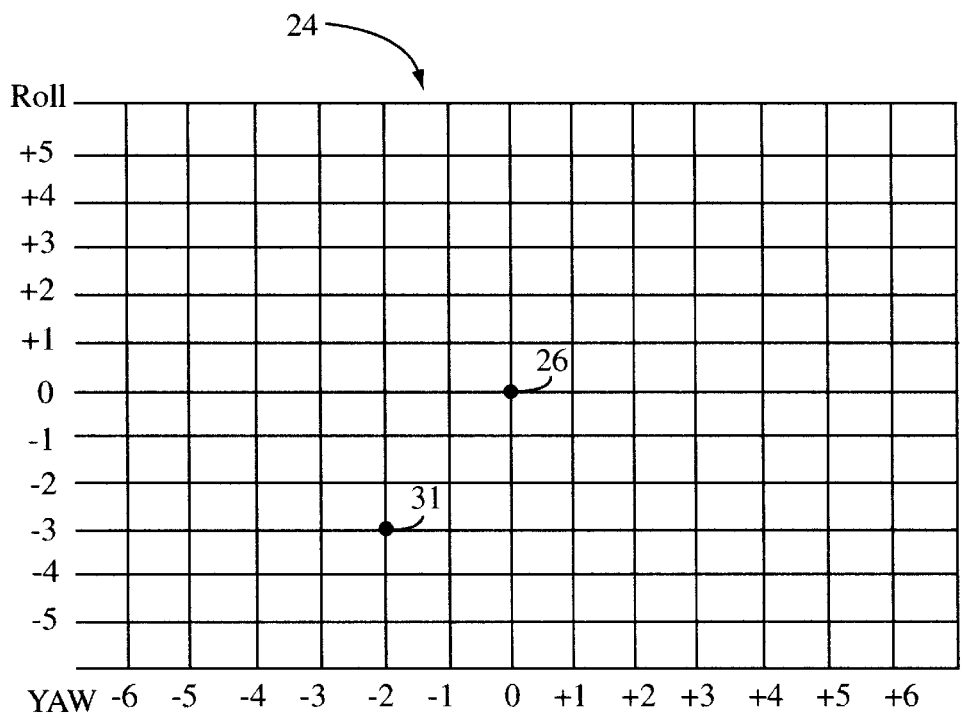
FIG. 3 is a grid further illustrating the alignment technique according to the present invention.

Referring now to FIG. 3, the reflective surface 24 is illustrated in greater detail. The laser pointing device 26 is located in the center of the surface 24, which corresponds to grid coordinates "0—0". As stated hereinabove, the reflected beam 30 strikes the surface at the point 31. The distance between the point 31 and the origin of the laser beam at the center is an indication of the roll and yaw misalignment bias of the sensor 10. More specifically, and according to the example shown in FIG. 3, the sensor has a yaw misalignment bias of −2 and a roll misalignment bias of −3.

The misalignment bias illustrated in FIG. 3, which is read on surface 23 (FIG. 2), may be read directly from the target surfaces and then entered into the aircraft's on-board computer. According to another embodiment, a vidicon, CCD array or a CMOS image sensor could replace the surfaces 23 and 24 to enable reading of the offset electronically.

Figure 4:
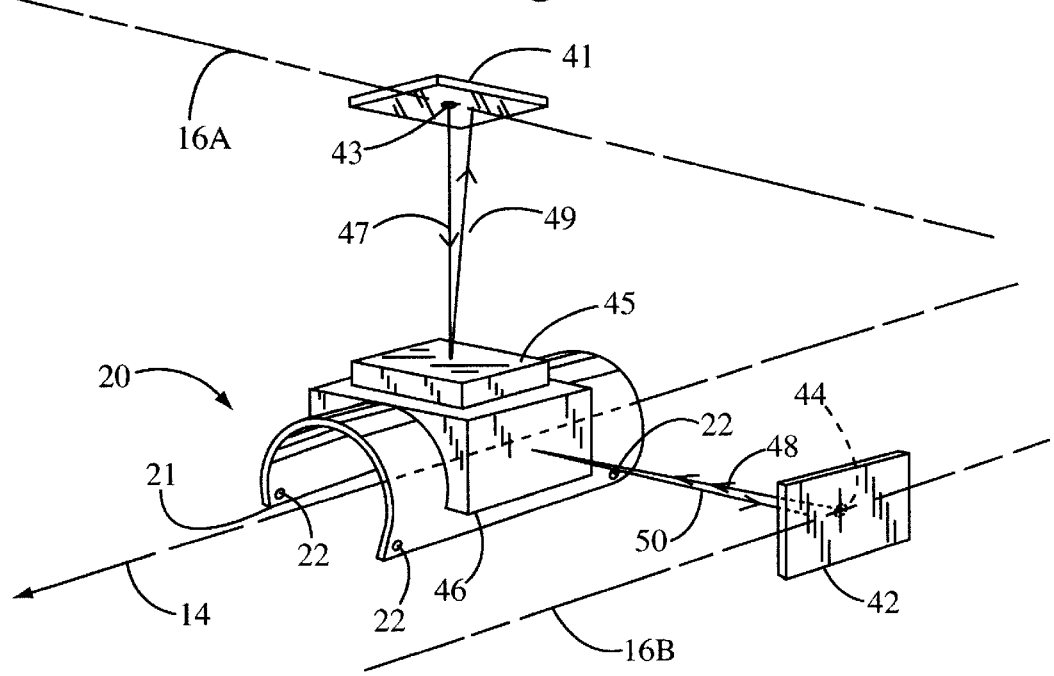
FIG. 4 is a schematic diagram illustrating an alternate embodiment alignment technique.

An alternate arrangement of the tool 20 may be to place the mirrors 27 and 28 on the tool 20, and to permanently place the measuring surfaces 23 and 24 (along with the lasers 25 and 26) onto the aircraft. Reference is made to FIG. 4, wherein the lasers and mirrors of FIG. 2 have been reversed and like reference numerals identify like components. Similar to the tool 20 described above, measuring surfaces 41 and 42 house low-power laser pointing devices 43 and 44, respectively; which devices are aligned normal to (or at other specific angles to) the measuring surfaces. Reflectors 45 and 46 are aligned with the tool 20 and are located such that laser beams 47 and 48 of the pointing devices 43 and 44 strike them and are reflected back (beams 49 and 50) onto the measuring surfaces 41 and 42, respectively. This allows the angular displacements to be read directly from the measuring surfaces 41 and 42.

Although the invention has been described with reference to a specific embodiment, this description is not meant to be construed in a limiting sense. Various modifications of the disclosed embodiment as well as alternative embodiments of the invention will become apparent to one skilled in the art upon reference to the description of the invention. It is therefore contemplated that the appended claims will cover any modifications of the embodiments that fall within the true scope of the invention.

We claim:

1. An apparatus for sensing misalignment between a first body and a second body, comprising:
   a. a first laser mounted on said first body and in the center of and normal to a first measuring surface aligned with an inertial frame reference of said first body;
   b. a second laser mounted on said first body at an angle to said first laser and in the center of and normal to a second measuring surface aligned with an inertial frame reference of said first body;
   c. a first reflector mounted to and aligned with an inertial reference frame of said second body and being disposed for reflecting a beam of light from said first laser, whereby misalignment in roll and yaw between said first and second body is reflected on said first measuring surface;
   d. a second reflector mounted and aligned with an inertial reference frame of said second body and canted equal to said angle, and being disposed for reflecting a beam of light from said second laser, whereby misalignment in roll and pitch between said first and second body is reflected on said second measuring surface.

2. The apparatus as in claim 1 wherein said first body is a sensor for mounting onto an aircraft.

3. The apparatus as in claim 1 wherein said first body is a sensor for mounting onto a boat.

4. The apparatus as in claim 1 wherein said first body is a sensor for mounting onto a land vehicle.

5. The apparatus as in claim 1 wherein said second body is an aircraft and said first body is a sensor for mounting onto said aircraft.

6. The apparatus as in claim 1 wherein said angle is ninety degrees.

7. The apparatus as in claim 1 wherein said angle is less than ninety degrees.

8. The apparatus as in claim 1 wherein said first and second measuring surfaces are charge coupled device arrays.

9. The apparatus as in claim 1 wherein said first and second measuring surfaces are arrays of CMOS image sensors.

10. The apparatus as in claim 1 wherein said first and second measuring surfaces are Vidicons.

11. An apparatus for sensing misalignment between an aircraft inertial reference frame and a frame reference of an attached sensor, said apparatus comprising:
   a. a first laser mounted on said sensor and in the center of and normal to a first measuring surface aligned with the frame reference of said sensor;
   b. a second laser mounted on said sensor perpendicular to said first laser and in the center of and normal to a second measuring surface aligned with the frame reference of said sensor;
   c. a first reflector mounted to and aligned with said inertial reference frame of said aircraft and being disposed for reflecting a beam of light from said first laser, whereby misalignment in roll and yaw between said sensor and said aircraft is reflected on said first measuring surface;
   d. a second reflector mounted to and aligned with said inertial reference frame of said aircraft and perpendicular with said first reflector, and being disposed for reflecting a beam of light from said second laser, whereby misalignment in roll and pitch between said sensor and said aircraft is reflected on said second measuring surface.

12. The apparatus as in claim 11 wherein said first and second measuring surfaces are charge coupled device arrays.

13. The apparatus as in claim 11 wherein said first and second measuring surfaces are arrays of CMOS image sensors.

14. The apparatus as in claim 11 wherein said first and second measuring surfaces are Vidicons.

15. An apparatus for sensing misalignment between a first body and a vehicle comprising:
   a. a laser mounted on said first body and in the center of and normal to a measuring surface aligned with a frame of reference of said first body; and, b. a reflector, mounted in a fixed position and aligned with an inertial frame of reference of said vehicle, and being disposed for reflecting a beam of light from said laser whereby misalignment in two axes between said first body and said vehicle is reflected on said measuring surface.

16. The apparatus as in claim 15 wherein said first body is a sensor.

17. The apparat s as in claim 15 wherein vehicle is an aircraft.

18. The apparatus as in claim 15 wherein vehicle said is a boat.

19. The apparatus as in claim 15 wherein said vehicle is a land vehicle.

20. An apparatus for sensing misalignment between an aircraft inertial reference frame and a frame reference of an attached sensor, said apparatus comprising:
    a. a first laser mounted on said aircraft and in the center of and normal to a first measuring surface aligned with the inertial frame reference of said aircraft;
    b. a second laser mounted on said aircraft perpendicular to said first laser and in the center of and normal to a second measuring surface aligned with the inertial frame reference of said aircraft;
    c. a first reflector mounted to and aligned with said frame reference of said sensor and being disposed for reflecting a beam of light from said first laser, whereby misalignment in roll and yaw between said sensor and said aircraft is reflected on said first measuring surface;
    d. a second reflector mounted to and aligned with said frame reference of said sensor and perpendicular with said first reflector, and being disposed for reflecting a beam of light from said second laser, whereby misalignment in roll and pitch between said sensor and said aircraft is reflected on said second measuring surface.

21. The apparatus as in claim 20 wherein said first and second measuring surfaces are charge coupled device arrays.

22. The apparatus as in claim 20 wherein said first and second measuring surfaces are arrays of CMOS image sensors.

23. The apparatus as in claim 20 wherein said first and second measuring surfaces are Vidicons.

24. A method for sensing misalignment between an aircraft inertial reference frame and a reference frame of an attached sensor, said method comprising:
    a. emitting a first light beam from and normal to a first measuring surface mounted on said sensor, said first measuring surface being aligned with said reference frame of said sensor;
    b. emitting a second light beam from and normal to a second measuring surface mounted on said sensor, said second measuring surface being aligned with said reference frame of said sensor;
    c. reflecting said first light beam from a reflector mounted on and aligned with an inertial reference frame of said aircraft, whereby misalignment in roll and yaw between said sensor and said aircraft is reflected on said first measuring surface;
    d. reflecting said second light beam from a reflector mounted perpendicular to said first reflector and aligned with said inertial reference frame of said aircraft, whereby misalignment in pitch and roll between said sensor and aircraft is reflected on said second measuring surface.

* * * * *